(12) United States Patent
Aso (10) Patent No.: US 11,780,019 B2
(45) Date of Patent: Oct. 10, 2023

(54) CUTTING INSERT AND CUTTING TOOL INCLUDING SAME

(71) Applicant: TUNGALOY CORPORATION, Fukushima (JP)

(72) Inventor: Takahiro Aso, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 3 days.

(21) Appl. No.: 17/585,890

(22) Filed: Jan. 27, 2022

(65) Prior Publication Data

US 2022/0250175 A1 Aug. 11, 2022

(30) Foreign Application Priority Data

Feb. 10, 2021 (JP) .................................. 2021-019426
Dec. 6, 2021 (JP) .................................. 2021-197916

(51) Int. Cl.
*B23C 5/20* (2006.01)
*B23C 5/10* (2006.01)

(52) U.S. Cl.
CPC ...... *B23C 5/202* (2013.01); *B23C 2200/0494* (2013.01); *B23C 2200/161* (2013.01); *B23C 2200/168* (2013.01)

(58) Field of Classification Search
CPC .............. B23C 5/202; B23C 2200/161; B23C 2210/168; B23C 2200/164; B23C 5/207;
(Continued)

(56) References Cited

U.S. PATENT DOCUMENTS 5,207,538 A * 5/1993 Satran ................... B23C 5/2213
D15/139
6,142,716 A * 11/2000 Jordberg ................. B23C 5/202
407/115
(Continued)

FOREIGN PATENT DOCUMENTS

AT 13514 U1 * 12/2013 ............. B23C 5/109
JP 5999586 B2 9/2016
(Continued)

*Primary Examiner* — Sara Addisu
(74) *Attorney, Agent, or Firm* — Studebaker & Brackett PC (57) ABSTRACT

Chip discharge control is further improved. A cutting insert includes an upper surface, a lower surface, a screw hole having an axis penetrating from the upper surface to the lower surface, a peripheral side surface, and a major cutting edge, a wiper edge, and an inner edge formed in an intersecting region between the upper surface and the peripheral side surface. In a side view in which the peripheral side surface on which the inner edge is formed is seen from a direction perpendicular to the axis, the inner edge includes a recessed part recessed toward the lower surface, a length $D_L$ of the inner edge on one side of the recessed part in the side view is longer than a length $D_R$ of the inner edge on the other side of the recessed part, a lowest point of the inner edge is at a position lower than a flat part of the upper surface, and at least a part of the inner edge on the one side is at a position higher than the flat part of the upper surface. A cutting edge angle $\varphi_{23L}$ of the inner edge on the one side of the recessed part is larger than a half of a cutting edge angle $\varphi_{23R}$ of the inner edge on the other side of the recessed part.

7 Claims, 10 Drawing Sheets

(58) Field of Classification Search
CPC .................. B23C 5/109; B23C 5/2213; B23C 2200/0416; B23C 2200/0494; B23C 5/2221
See application file for complete search history.

(56) References Cited

U.S. PATENT DOCUMENTS

| | | | | |
|---|---|---|---|---|
| 6,196,770 | B1 * | 3/2001 | Astrom | B23C 5/109 407/43 |
| 8,419,319 | B2 * | 4/2013 | Hatta | B23C 5/202 407/113 |
| 10,343,221 | B2 * | 7/2019 | Nam | B23B 27/02 |
| 10,350,686 | B2 * | 7/2019 | Oprasic | B23C 5/202 |
| 11,453,074 | B2 * | 9/2022 | Andersson | B23C 5/202 |
| 2013/0115022 | A1 * | 5/2013 | Ishi | B23C 5/202 407/100 |
| 2017/0197259 | A1 | 7/2017 | Kumoi et al. | |
| 2017/0304911 | A1 | 10/2017 | Kumoi | |
| 2019/0283149 | A1 | 9/2019 | Touma | |
| 2020/0361010 | A1 * | 11/2020 | Ishi | B23C 5/202 |
| 2022/0072635 | A1 * | 3/2022 | Aso | B23C 5/109 |

FOREIGN PATENT DOCUMENTS

| | | | | |
|---|---|---|---|---|
| JP | 6624306 | B2 | 1/2020 | |
| WO | 2016/060195 | A1 | 4/2016 | |
| WO | WO-2016060195 | A1 * | 4/2016 | ............. B23C 5/109 |
| WO | 2016/084891 | A1 | 6/2016 | |
| WO | WO-2016167472 | A1 * | 10/2016 | ........... B23C 5/1081 |

* cited by examiner

CUTTING INSERT AND CUTTING TOOL INCLUDING SAME

BACKGROUND

Field

The present invention relates to a cutting insert and a cutting tool including the same.

Description of Related Art

Conventionally, various technologies have been proposed for cutting performance improvement in shoulder machining tools. These technologies include, for instance, one in which a bottom surface shape of a cutting edge is formed to have a V-shape in order to improve a clamping performance (see Japanese Patent No. 5999586, for example) and one which is configured so that cutting resistance of a cutting edge is reduced, whereby cracks are hardly generated (see Japanese Patent No. 6624306, for example).

SUMMARY

However, in Japanese Patent No. 5999586, though a shape of the cutting edge is described, improvement of chip discharge control during cutting is not referred to. In addition, in Japanese Patent No. 6624306, due to a feature in which an inner cutting edge having a lowered right shoulder is positioned lower than a boss surface when seen toward a side surface with the inner cutting edge, the chip discharge control is poor. Improvement of the chip discharge control while the cutting performance is improved as above is important in further improvement of the performances of the cutting insert and the cutting tool including the same.

Therefore, the present invention has an object to provide a cutting insert which enables further improvement of the chip discharge control and a cutting tool including the same.

A cutting insert which is one mode of the present invention includes:
  an upper surface serving as a first end surface and having a flat part,
  a lower surface serving as a second end surface and being
    a surface on an opposite side to the upper surface, and moreover having a mounting surface relative to a cutting tool body,
  a screw hole having an axis penetrating from the upper surface to the lower surface,
  a peripheral side surface formed so as to connect the upper surface and the lower surface, and
  a major cutting edge, a wiper edge, and an inner edge formed in an intersecting region between the upper surface and the peripheral side surface, in which
  in a side view in which the peripheral side surface on which the inner edge is formed is seen from a direction perpendicular to the axis, the inner edge includes a recessed part recessed toward the lower surface,
  a length $D_L$ of the inner edge located on one side of the recessed part and also a side far from the wiper edge in the side view is longer than a length $D_R$ of the inner edge on the other side of the recessed part,
  a lowest point of the inner edge is located at a position lower than the flat part of the upper surface, and at least a part of the inner edge on the one side is located at a position higher than the flat part of the upper surface, and
  a cutting edge angle $\varphi_{23L}$ of the inner edge on the one side of the recessed part is larger than a half of a cutting edge angle $\varphi_{23R}$ of the inner edge on the other side of the recessed part.

As described above, according to the cutting insert including the inner edge having the recessed part and in which the length of the inner edge on the one side of the recessed part is longer than the length of the inner edge on the other side, chips discharged from the inner edge go toward a tool peripheral side, whereby improvement of the chip discharge control and moreover, suppression of chip biting can be promoted. Moreover, by having the inner edge with such a structure that the lowest point is located at the position lower than the flat part of the upper surface of the cutting insert, and at least a part of the inner edge on the one side is located at the position higher than the flat part of the upper surface, the chips discharged from a lowest point part is brought into contact with the upper surface and as a result, separation of the chips is improved, whereby further improvement of the chip discharge control and further suppression of the chip biting can be promoted. Moreover, if the cutting edge angle $\varphi_{23L}$ of the inner edge on the one side of the recessed part is too small, an amount capable of engraving a cutting target (workpiece) is reduced during cutting, but on this point, by increasing the cutting edge angle $\varphi_{23L}$ larger than a predetermined value as described above, the engraving amount during cutting can be increased to some degree.

In the cutting insert as above, the cutting edge angle $\varphi_{23R}$ of the inner edge on the other side of the recessed part may be smaller than inclination $\theta_{23R}$ indicating an inclination angle of the inner edge on the other side in a side view.

In the cutting insert as above, the cutting edge angle $\varphi_{23L}$ of the inner edge on the one side of the recessed part may be larger than inclination $\theta_{23L}$ indicating an inclination angle of the inner edge on the one side in a side view.

In the cutting insert as above, in a side view, a length $D_R$ of the inner edge on the other side of the recessed part may be less than a half of a length $D_L$ of the inner edge on the one side of the recessed part.

In the cutting insert as above, in a side view, the inclination $\theta_{23R}$ of the inner edge on the other side of the recessed part may be larger than the inclination $\theta_{23L}$ of the inner edge on the one side of the recessed part.

In the cutting insert as above, in the side view, the inclination $\theta_{23L}$ of the inner edge on the one side of the recessed part may be smaller and the inclination $\theta_{23R}$ of the inner edge on the other side of the recessed part may be larger than inclination $\theta_{24}$ indicating an inclination angle of the wiper edge.

In the cutting insert as above, in a top view seen along the axis, the cutting edge angle indicating inclination of the inner edge on the one side of the recessed part and the cutting edge angle indicating the inclination of the inner edge on the other side of the recessed part may be larger than the inclination angle of the wiper edge.

Moreover, a cutting tool, which is one mode of the present invention is an indexable rotary cutting tool including a tool body rotated around a rotational axis as a center and having an insert mounting seat to hold a cutting insert and a cutting insert as above to be mounted on the tool body so that a mounting surface is brought into contact with the insert mounting seat.

BRIEF DESCRIPTION OF DRAWINGS

FIG. 4B is a side view of the cutting insert when seen from the direction opposing the first peripheral side-surface portion along the first direction D1 and illustrating a length of an inner edge and the like;

DETAILED DESCRIPTION

Figure 1:
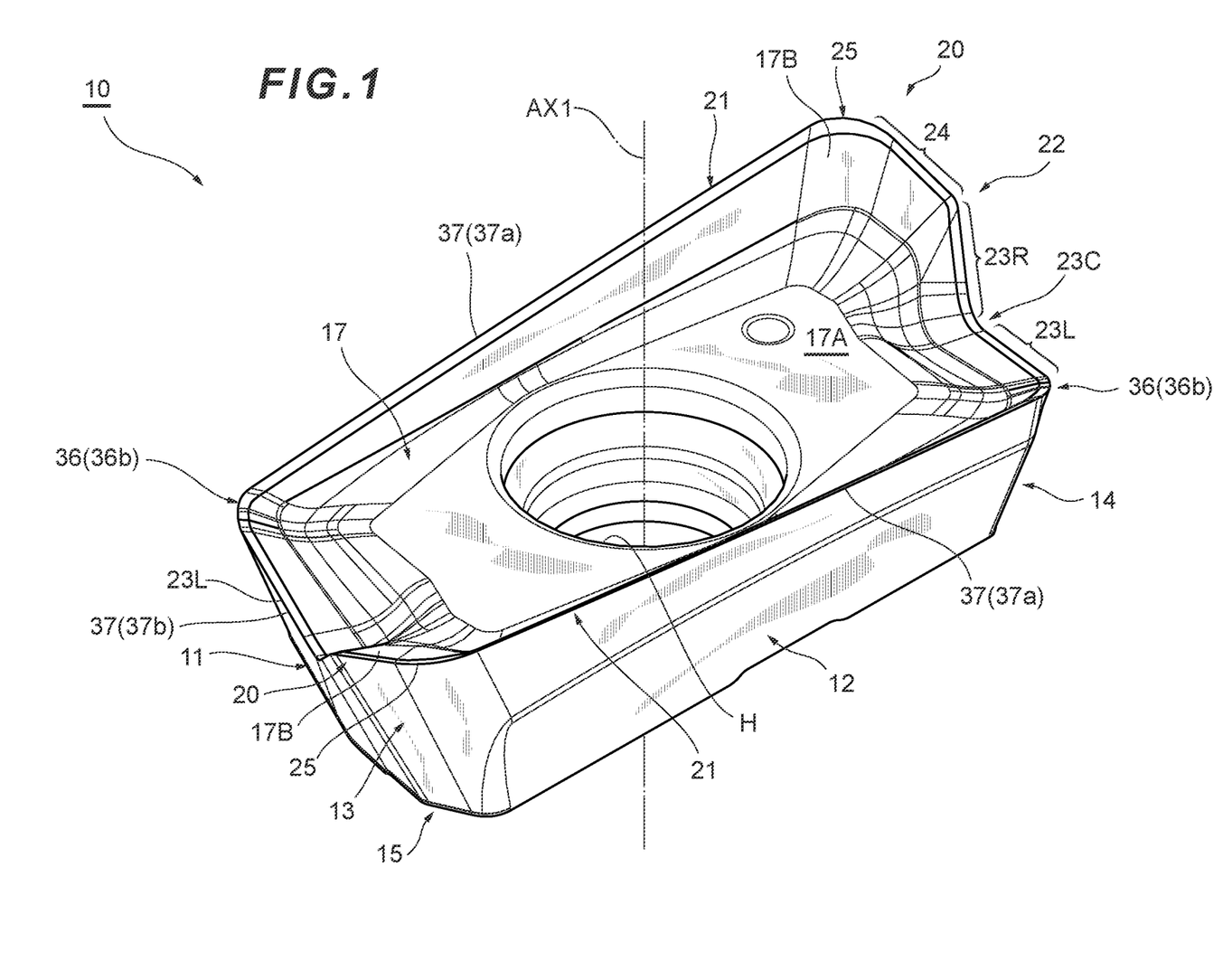
FIG. 1 is a perspective view of a cutting insert.

Hereinafter, preferred embodiments of a cutting insert according to the present invention and a cutting tool including this will be described in detail by referring to the figures (see FIG. 1 and the like).

Outline of Cutting Insert

The cutting insert 10 of this embodiment has a substantially square (in more detail, an approximate parallelogram) plate shape. The cutting insert 10 is basically constituted by an upper surface (first end surface) 17 having a substantially square shape, a lower surface (second end surface) 19 disposed so as to oppose the upper surface 17, and a peripheral side surface 15 which connects the upper surface 17 and the lower surface 19 to each other. A through hole H in which a central axis AX1 is defined is provided so as to penetrate a substantially central part of the upper surface 17 and a substantially central part of the lower surface 19. This central axis AX1 is originally a central axis of the cutting insert 10, and in this embodiment, the central axis of the cutting insert 10 matches the central axis of the through hole H, but this is not limiting. That is, even in a mode in which the through hole H is not present, the central axis AX1 can be defined. The cutting insert 10 is constituted to be 180° rotationally symmetric around the central axis AX1. Note that, as is obvious from the following description, since the cutting insert 10 includes a cutting edge only on a side of the upper surface 17, the first end surface is referred to as an upper surface, and the second end surface as a lower surface in this specification.

Figure 3:
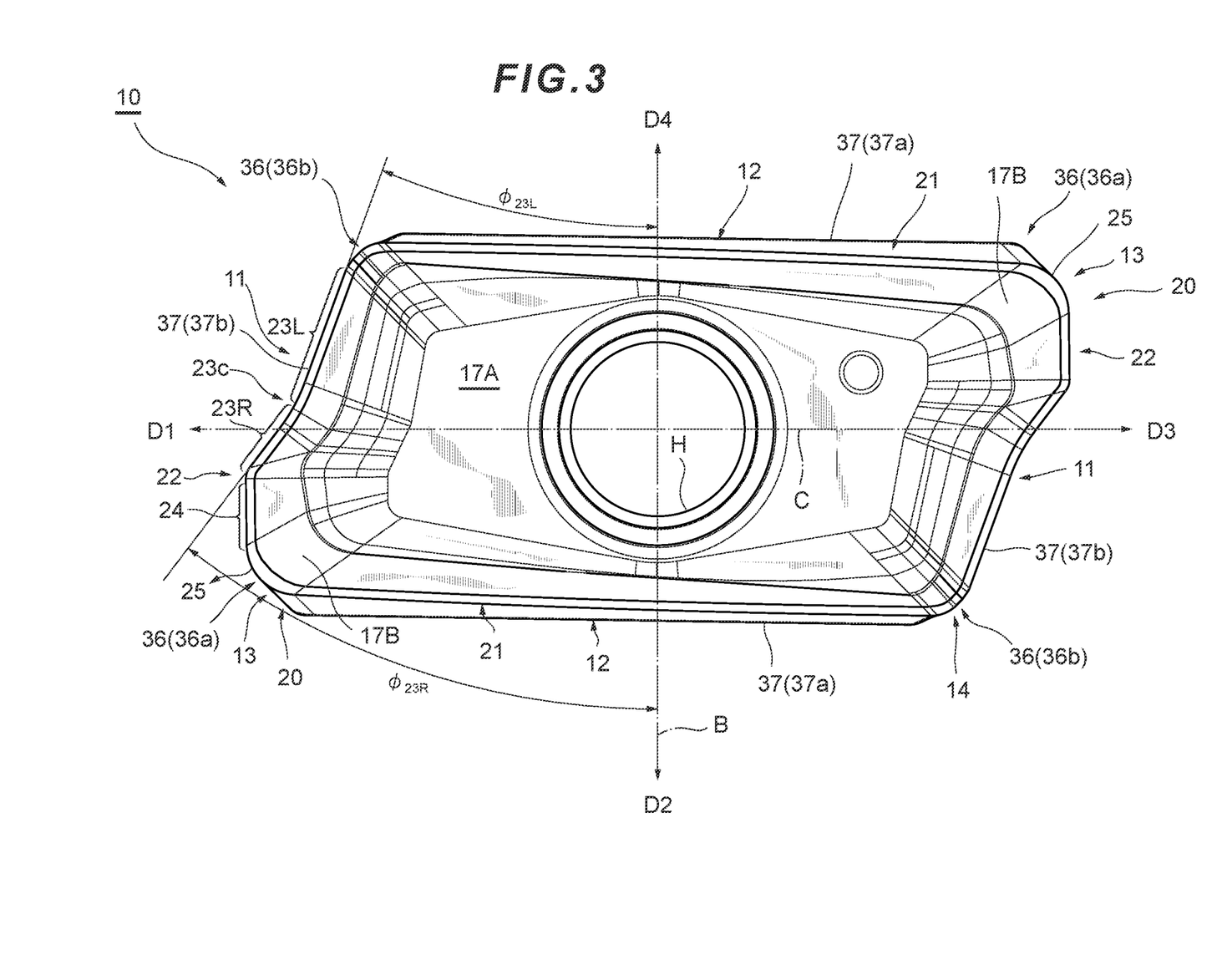
FIG. 3 is a view (top view) of the cutting insert when seen from a direction opposing an upper surface.

Note that, in description of a shape/structure of the cutting insert 10 so as to be understood easily, a first direction D1, a second direction D2, a third direction D3, and a fourth direction D4 are defined (see FIG. 3 and the like). The first direction D1 is a direction perpendicular to the central axis AX1 and corresponding to a left direction on a page in FIG. 3. The second direction D2 is a direction perpendicular to the central axis AX1 and corresponding to a lower direction on the page in the same figure. The third direction D3 is a direction perpendicular to the central axis AX1 and corresponding to a right direction on the page in the same figure. The fourth direction D4 is a direction perpendicular to the central axis AX1 and corresponding to an upper direction on the page in the same figure. Moreover, an axis B perpendicular to the central axis AX1 and an axis C perpendicular both to the central axis AX1 and the axis B are defined. The axis B is an axis perpendicularly intersecting a central point (a point at an equal distance from the upper surface 17 and the lower surface 19) of the central axis AX1 and extending toward the second direction D2 and the fourth direction D4. The axis C is an axis intersecting a central point of the central axis AX1 (the point at the equal distance from the upper surface 17 and the lower surface 19) perpendicularly to the central axis AX1 and the axis B and extending toward the first direction D1 and the third direction D3 (see FIG. 1 and the like).

The upper surface 17 has a substantially square shape constituted by four curved corner portions 36, four side portions 37 formed between the corner portions 36 when seen from the direction opposing the upper surface 17 (that is, on a top view). The four side portions 37 are constituted by two long side portions 37a and two short side portions 37b. A pair of the long side portions 37a are opposed to each other, and a pair of the short side portions 37b are also disposed so as to oppose each other. Moreover, the four corner portions 36 are constituted by two corner portions (cutting corners) 36a relating to the cutting and two corner portions 36b not relating to the cutting. The corner portions 36a relating to the cutting and the corner portions 36b not relating to the cutting are disposed alternately with the long side portion 37a or the short side portion 37b between them. Therefore, the upper surface 17 of the cutting insert 10 of this embodiment forms a substantially square shape so as to be 180° rotationally symmetric with respect to the central axis AX1 in FIG. 3, but the present invention is not limited to this but may be other shapes (a triangular shape, a pentagonal shape or the like as extremes). Moreover, the peripheral side surface 15 is constituted by a first peripheral side-surface portion 11 adjacent to the short side portion 37b and facing the first direction D1/third direction D3, a second peripheral side-surface portion 12 adjacent to the long side portion 37a and facing the second direction D2/fourth direction D4, a corner peripheral side-surface portion 13 adjacent to the corner portion 36a, and a corner peripheral side-surface portion 14 adjacent to the corner portion 36b, and they continue to each other in a peripheral direction, here. Shapes and sizes of these surfaces can be changed as appropriate. Note that, since the cutting insert 10 constituted so as to be 180° rotationally symmetric around the central axis AX1, the two first peripheral side-surface portions 11 are opposed to each other, and the two second peripheral side-surface portions 12 are opposed to each other (see FIG. 3 and the like).

On an intersecting edge portion between the upper surface 17 and the peripheral side surface 15, a plurality of cutting edges 20 are formed. Since the cutting insert 10 is 180° rotationally symmetric with respect to the central axis AX1, as described above, more accurately, it has two cutting edges 20 on the intersecting edge portion between the upper surface 17 and the peripheral side surface 15. Each of the cutting edges 20 is constituted by a major cutting edge 21, a corner cutting edge 25, and a minor cutting edge 22. The major cutting edge 21 is formed along the entire intersecting edge portion between the upper surface 17 (corresponding to the long side portion 37a) and the second peripheral side-surface portion 12. That is, the major cutting edge 21 extends between the two corner portions 36a and 36b adjacent to each other. The corner cutting edge 25 is formed along the intersecting edge portion between the upper surface 17 (corresponding to the corner portion 36) and the peripheral side surface 15. One of end portions of the corner cutting edge 25 is connected to one of end portions of the major cutting edge 21. The minor cutting edge 22 is formed along a part of the intersecting edge portion between the upper surface 17 (corresponding to the short side portion 37b) and the first peripheral side-surface portion 11. That is, the minor cutting edge 22 extends to a position advanced by a certain distance in the direction of the corner portion 36b, starting from the corner portion 36a, between the two corner portions 36a and 36b adjacent to each other. One of end portions of the minor cutting edge 22 is connected to the end portion different from the one connected to the major cutting edge 21 of the corner cutting edge 25. Therefore, in this embodiment, the major cutting edge 21, the corner cutting edge 25, and the minor cutting edge 22 are continuously connected in this order. Moreover, on the intersecting edge portion between the upper surface 17 and the first peripheral side-surface portion 11, a portion on the corner portion 36b side of the minor cutting edge 22 may be formed as an inner edge. The inner edge is a cutting edge used in engraving such as ramping or the like.

Figure 2:
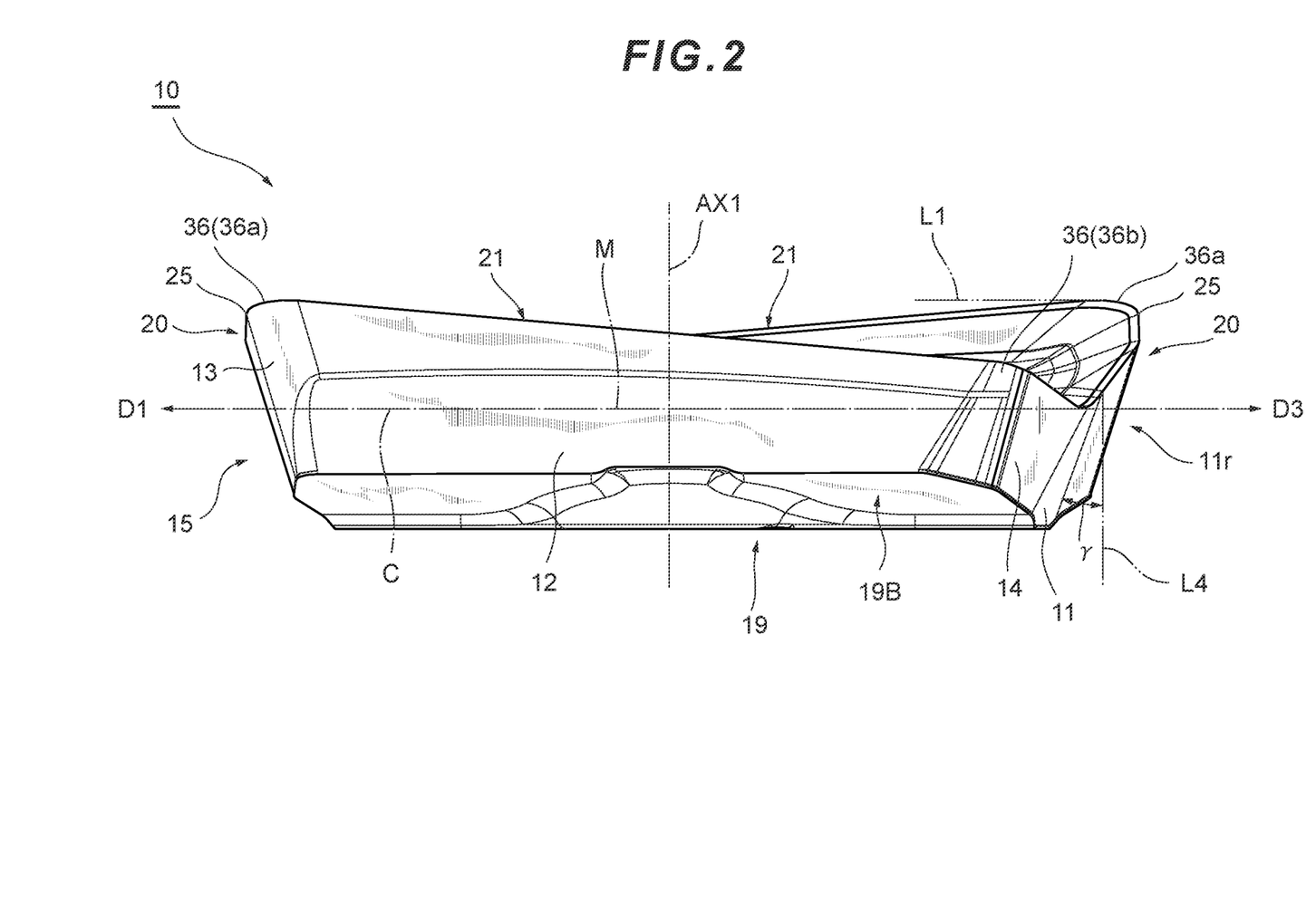
FIG. 2 is a side view of the cutting insert when seen from a direction D2 opposing a second peripheral side-surface portion.
Figure 4A:
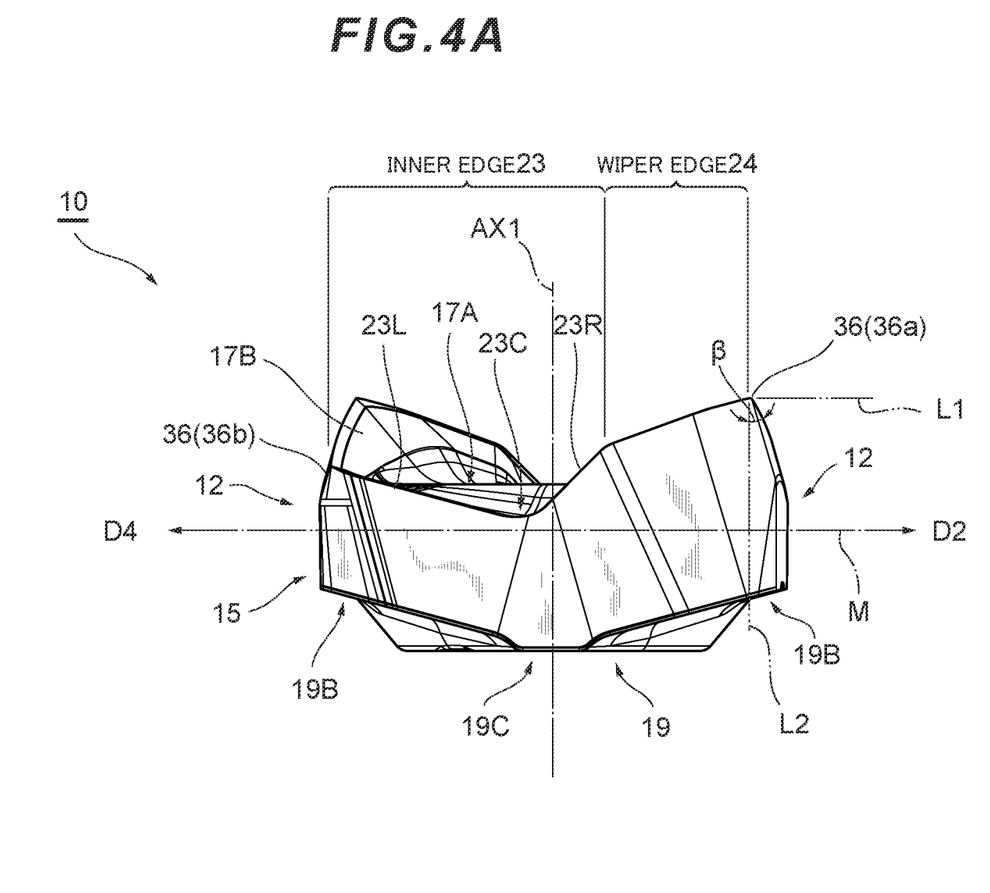
FIG. 4A is a side view of the cutting insert when seen from a direction opposing a first peripheral side-surface portion along a first direction D1.

Here, description will be made by referring to a side view (FIG. 4A) when seen from the direction D1 (or D3) opposing the first peripheral side-surface portion 11 and a side view (FIG. 2) when seen from the direction D2 (or D4) opposing the second peripheral side-surface portion 12 continuing to eth minor cutting edge 22. As illustrated in FIG. 2 and FIG. 4A, a surface penetrating the peripheral side surface 15 between the upper surface 17 and the lower surface 19 and intersecting the central axis AX1 at a right angle is defined, and the surface is defined as an intermediate surface M. The major cutting edge 21 is formed so that a distance from the intermediate surface M is changed between the two corner portions 36a and 36b. Specifically, the major cutting edge 21 extends substantially linearly so as to gradually approach from the upper surface 17 side to the lower surface 19 side (that is, so as to gradually approach the intermediate surface M) as it advances from the corner portion 36a to the corner portion 36b direction.

Moreover, the minor cutting edge 22 is also formed so that the distance from the intermediate surface M is changed between the two corner portions 36a and 36b. Specifically, the minor cutting edge 22 is constituted by an inner edge 23 and a wiper edge 24 (see FIG. 4A), and in them, the wiper edge 24 extends linearly so as to gradually approach from the upper surface 17 side to the lower surface 19 side (that is, so as to gradually approach the intermediate surface M) as it goes from the corner portion 36a to the corner portion 36b direction. The inner edge 23 has a right-side inner edge 23R with right up continuing to the wiper edge 24, a left-side inner edge 23L with left up formed closer to the corner portion 36b, and a recessed part 23c formed between these right-side inner edge 23R and left-side inner edge 23L (see FIG. 4A and the like).

Note that the minor cutting edge 22 may be formed only on a part of the short side portion 37b instead of the entire part of that. The corner cutting edge 25 extends so as to smoothly connect the adjacent major cutting edge 21 and the adjacent minor cutting edge 22 to each other. Therefore, in the cutting edge 20, the corner cutting edge 25 is a cutting edge part which is the most separated from the intermediate surface M in an insert thickness direction, which is a direction in parallel with the central axis AX1 (see FIG. 4A and the like).

In an indexable rotary cutting tool (such as an endmill, for example) 100 which will be described later, the major cutting edge 21 is a cutting edge having a function of cutting a machined side surface of a workpiece. The minor cutting edge 22 is a cutting edge having a function of cutting a machined bottom surface of the workpiece. The corner cutting edge 25 is a cutting edge having a function of cutting a corner part between the machined side surface and the machined bottom surface of the workpiece.

A part of the upper surface 17 functions as a rake surface 17B in relation with the related cutting edge (a set of cutting edge portions) 20. The rake surface 17B is a portion adjacent to each cutting edge portion (the major cutting edge 21, the minor cutting edge 22, the corner cutting edge 25) in the upper surface 17 and is an inclined surface which gradually approaches the intermediate surface M as it is separated from the cutting edge portion (the major cutting edge 21, the minor cutting edge 22, the corner cutting edge 25). Specifically, a positive angle as a rake angle (though not particularly illustrated, a "rake angle α", for example) is given to the rake surface 17B. Here, the rake angle α means an intersecting angle between a virtual plane L1 (see FIG. 2 and FIG. 4A) defined to be at a right angle with respect to the central axis AX1 and to pass any one of points on the major cutting edge 21 and the rake surface 17B. For example, the rake angle α is preferably within a range from 40° to 50° and is set to approximately 45° in this embodiment. However, it is needless to say that the rake angle α is not limited to this angle but can be changed as appropriate depending on the circumstances. Note that, in the cutting insert 10, the rake angle is substantially constant over the entire cutting edge but it may be changeable. Moreover, around the through hole H of the upper surface 17, a flat part constituted by a flat surface (extending so as to be orthogonal to the central axis AX1) 17A (this surface is also called a "boss surface" in this specification) is formed. That is, the rake surface 17B extends between the cutting edge 20 and the boss surface 17A.

A part of the peripheral side surface 15 functions as a flank in relation with the related cutting edge 20 (the major cutting edge 21, the minor cutting edge 22, the corner cutting edge 25, which are a set of cutting edge portions). Specifically, the entire second peripheral side-surface portion 12 adjacent to the major cutting edge 21 functions as the flank. Regarding the first peripheral side-surface portion 11 adjacent to the minor cutting edge 22, not the entirety thereof but only a portion (indicated by numeral character 11r in the figure) to which the minor cutting edge 22 is directly connected substantially functions as the flank. The entire corner peripheral side-surface portion 14 adjacent to the corner cutting edge 25 functions as the flank.

The second peripheral side-surface portion 12 which functions as a flank of the major cutting edge 21 is inclined such that it gradually separated from the central axis AX1 with relatively steep inclination and then, from the middle of it, is gradually separated with relatively gentle inclination as it goes from the upper surface 17 side to the lower surface 19 side when seen from the first direction D1 (or the third direction D3) opposing the first peripheral side-surface portion 11 (that is, in FIG. 4A). That is, the second peripheral side-surface portion 12 is formed so that a clearance angle β (see FIG. 4A) becomes negative. Here, the clearance angle β in relation with the major cutting edge 21 means an intersecting angle between a virtual plane L2 defined to be in parallel with the central axis AX1 and to follow the major cutting edge 21 and the first peripheral side-surface portion 11. Particularly, this clearance angle is preferably defined on a section along a line defined so as to be orthogonal to the cutting edge in FIG. 2. In the case of this embodiment, the clearance angle β is a negative angle. Therefore, it can be so expressed that the second peripheral side-surface portion 12 is formed so as to be gradually separated to an outer side of the cutting insert from the virtual plane L2 side as it goes from the upper surface 17 side to the lower surface 19 side. For example, the clearance angle β with respect to the major cutting edge 21 is preferably within a range from −5° to −20°, or more preferably within a range from −10° to −20° (a range from −20° or more to −10° or less), and it is set to approximately −15° in this embodiment as an example. It is needless to say that the clearance angle β with respect to the major cutting edge 21 is not limited to the above but can be changed as appropriate depending on the circumstances.

On the other hand, the first peripheral side-surface portion 11 having a portion 11r which functions as a flank of the minor cutting edge 22 is inclined so as to gradually approach the central axis AX1 as it goes from the upper surface 17 side to the lower surface 19 side (see FIG. 2 illustrating the third direction D3 side). That is, in the first peripheral side-surface portion 11, the portion 11r which functions as the flank is formed so that the clearance angle (illustrated by a sign γ in FIG. 2) becomes positive. Here, the clearance angle γ relating to the minor cutting edge 22 means an intersecting angle between a virtual plane L4 defined so as to be in parallel with the central axis AX1 and to follow the minor cutting edge 22 and the portion 11r which functions as the flank of the first peripheral side-surface portion 11 and is preferably defined on a section along a line defined so as to be orthogonal to the cutting edge (see FIG. 2). Note that an angle when the portion 11r which functions as the flank is located on an inner side from the virtual plane L4 is supposed to be positive. For example, the clearance angle γ relating to the minor cutting edge 22 is preferably a positive angle within a range from 0° to 10°, and in the case of this embodiment, it is approximately 5°. Therefore, it can be considered that the portion 11r which functions as the flank in the first peripheral side-surface portion 11 is formed so as to be gradually separated from the virtual plane L4 side to an inner side of the cutting insert as it goes from the upper surface 17 side to the lower surface 19 side. However, it is needless to say that the clearance angle γ relating to the minor cutting edge 22 is not limited to the above but can be changed as appropriate depending on the circumstances. However, the clearance angle γ is preferably a positive angle.

Moreover, the corner peripheral side-surface portion 13 which functions as a flank of the corner cutting edge 25 is formed such that the clearance angle is negative on a portion located on the major cutting edge 21 side, while the clearance angle is positive on a portion located on the minor cutting edge 22 side. That is, the corner peripheral side-surface portion 13 has a portion whose clearance angle is gradually changed in a peripheral direction so that the corner peripheral side-surface portion 13 smoothly connects the peripheral side-surface portions 11 and 12 on both adjacent sides.

Furthermore, in the first peripheral side-surface portion 11, a portion on a spot excluding the portion 11r which functions as the flank functions as a restraining surface in contact with a side wall surface of an insert mounting seat 120 provided on a tool body 110.

In the cutting insert 10 of this embodiment, a portion disposed adjacent to the major cutting edge 21 in the peripheral side surface 15 is constituted only by the second peripheral side-surface portion 12, but the present invention is not limited to that. For example, another peripheral side-surface portion may be provided between the upper surface 17 and the second peripheral side-surface portion 12 or between the second peripheral side-surface portion 12 and the lower surface 19. That is, a peripheral side-surface portion connected to the major cutting edge 21 in the peripheral side surface 15 may be formed so that a plurality of surface portions are connected from the upper surface 17 side toward the lower surface 19 side.

The lower surface 19 has two inclined portions (or inclined surfaces) 19B which are gradually separated from the virtual plane L1 (or the intermediate surface M) as they go from the second peripheral side-surface portion 12 side to the central axis AX1 side (see FIG. 2 and FIG. 4A). The two inclined portions 19B are connected to two second peripheral side-surface portions 12, respectively. Each of the inclined portions 19B extends along the major cutting edge 21 thereof so as to be located on the rear side of the related major cutting edge 21. Between the two inclined portions 19B, a flat part 19C is formed so as to connect the respective inclined portions 19B. That is, the lower surface 19 has a constitution in which the flat part 19C is sandwiched between the two inclined portions 19B and has a portion appearing to be substantially a V-shape when seen from a direction (the first direction D1, for example) opposing the first peripheral side-surface portion 11. The lower surface 19 functions as a seating surface into contact with the bottom wall surface of the insert mounting seat 120 provided on the tool body 110.

The cutting insert 10 can be produced from a hard material such as an ultrahigh-pressure sintered body containing cemented carbide, cermet, ceramic or diamond or cubic boron nitride or the one coated with them.

Inner Edge of Cutting Insert and the Like

Subsequently, featured portions of the cutting insert 10 of this embodiment will be described. As described above, the cutting insert 10 shown in FIG. 1 and the like are mainly for milling tools and designed particularly as an insert suitable for square shoulder milling or ramping by an endmill. The cutting insert 10 of this embodiment is configured to further improve the chip discharge control in ramping or the like by improving the shape particularly of the inner edge 23.

Here, for convenience of description on the shape/structure of the cutting insert 10, an axis B perpendicular to the central axis AX1 and an axis C perpendicular both to the central axis AX1 and the axis B are defined. The axis B is an axis perpendicularly intersecting a central point (point at an equal distance from the upper surface 17 and the lower surface 19) of the central axis AX1 and extending toward the second direction D2 and the fourth direction D4. The axis C is an axis intersecting the central point (point at an equal distance from the upper surface 17 and the lower surface 19) of the central axis AX1 perpendicularly to the central axis AX1 and the axis B and extending toward the first direction D1 and the third direction D3 (see FIG. 3 and the like). In this embodiment, the axis B and the axis C are on the intermediate surface M.

As described above, the minor cutting edge 22 of the cutting insert 10 of this embodiment is constituted by the inner edge 23 and the wiper edge 24 formed having the V-shape on a side view when seen from the direction opposing the first peripheral side-surface portion 11 along the first direction D1 (or the third direction D3). In them, the inner edge 23 has the right-side inner edge 23R with right up, the left-side inner edge 23L with left up, and the recessed part 23c having a shape recessed toward the lower surface 19 (see FIG. 4A and the like). Here, in this embodiment, in the side view seen from the direction opposing the first peripheral side-surface portion 11 along the first direction D1, the inner edge 23 is formed such that a length $D_L$ on one side (in the case of this embodiment, the left-side inner edge 23L) of the inner edge 23 disposed on left and right of the recessed part 23c is longer than a length $D_R$ on the other side (in the case of this embodiment, the right-side inner edge 23R) (see FIG. 4B). Moreover, the inner edge 23 of this embodiment is formed such that a lowest point (in the case of this embodiment, the position of the recessed part 23c) in the direction along the central axis AX1 is located at a position lower than the boss surface 17A of the upper surface 17 (that is, a position closer to the lower surface 19 than the boss surface 17A), and at least a part of the inner edge on the one side (in the case of this embodiment, the left-side inner edge 23L) is located at a position higher than the boss surface 17A of the upper surface 17 (in other words, at the position more separated from the lower surface 19) (see FIG. 4B and the like). As described above, according to the cutting insert 10 which employed the inner edge 23 in which the length $D_L$ of the left-side inner edge 23L is longer than the length $D_R$ of the right-side inner edge 23R, a portion of the rake surface continuing to the left-side inner edge 23L is faced to an outer peripheral side more largely, and chips discharged from the inner edge 23 flow this rake surface portion toward a tool outer peripheral side (see FIG. 9), whereby improvement of the chip discharge control and suppression of chip biting can be realized. Moreover, as described above, according to the cutting insert 10 which employed the inner edge 23 formed such that the lowest point is lower than the boss surface 17A of the upper surface 17, by bringing the chips discharged from the portion of the lowest point (in the case of this embodiment, the recessed part 23c) into contact with the boss surface 17A, chip separation can be improved, and further improvement of the chip discharge control and suppression of chip biting can be realized.

Figure 4B:
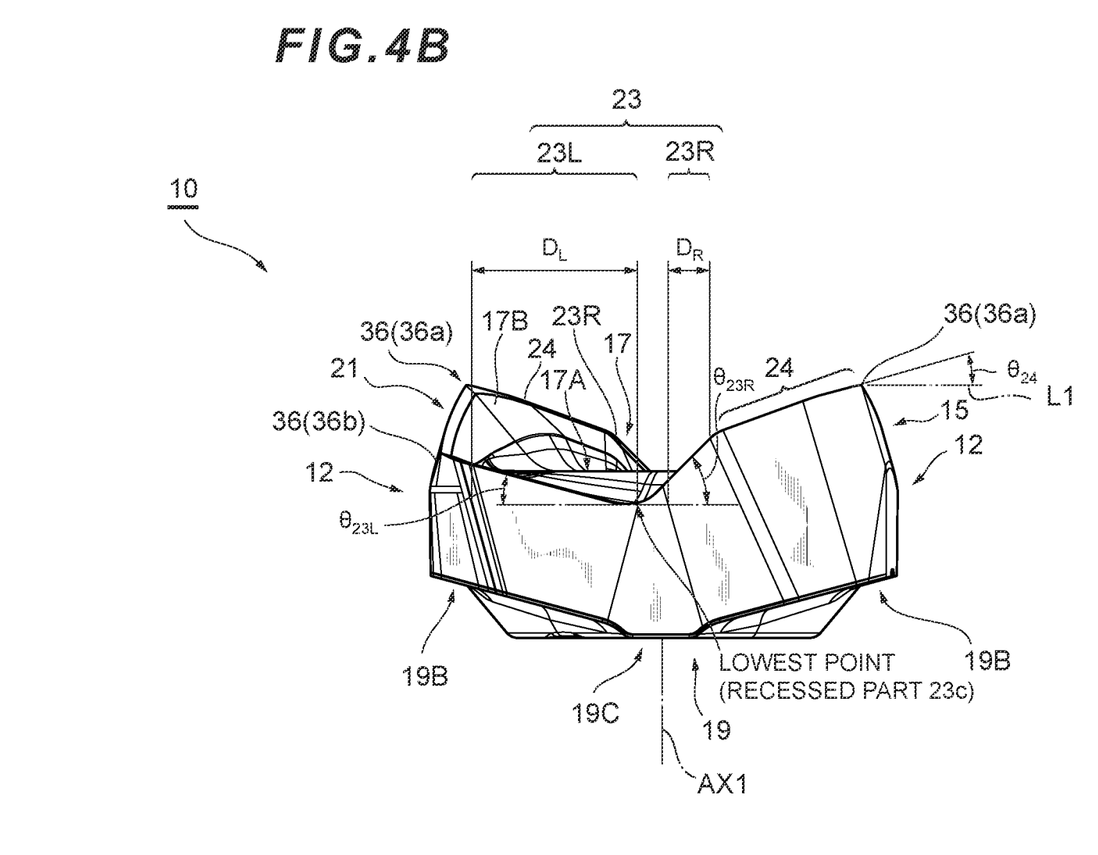
Figure 5:
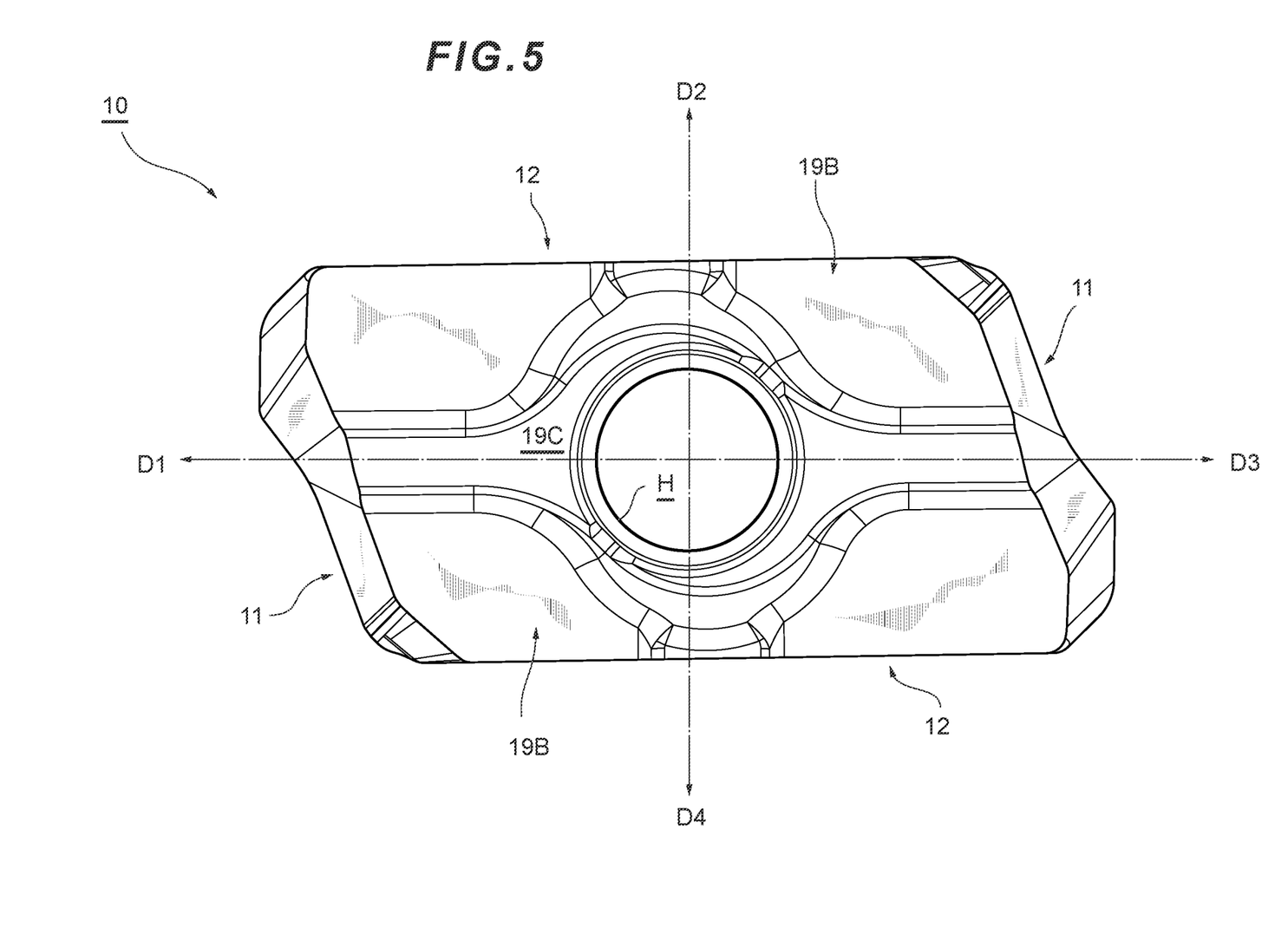
FIG. 5 is a view (bottom view) of the cutting insert when seen from a direction opposing a lower surface.
Figure 6:
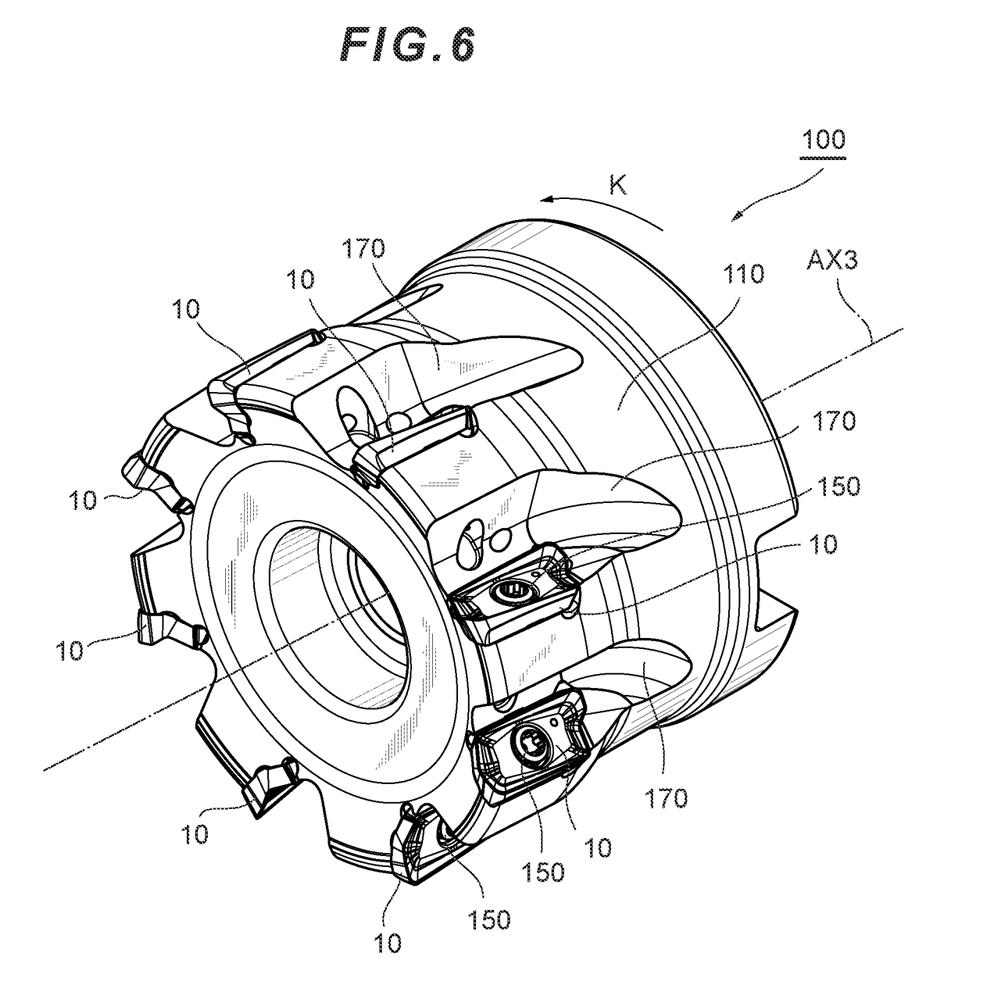
FIG. 6 is a perspective view of an indexable rotary cutting tool when seen from a leading end portion side.
Figure 7:
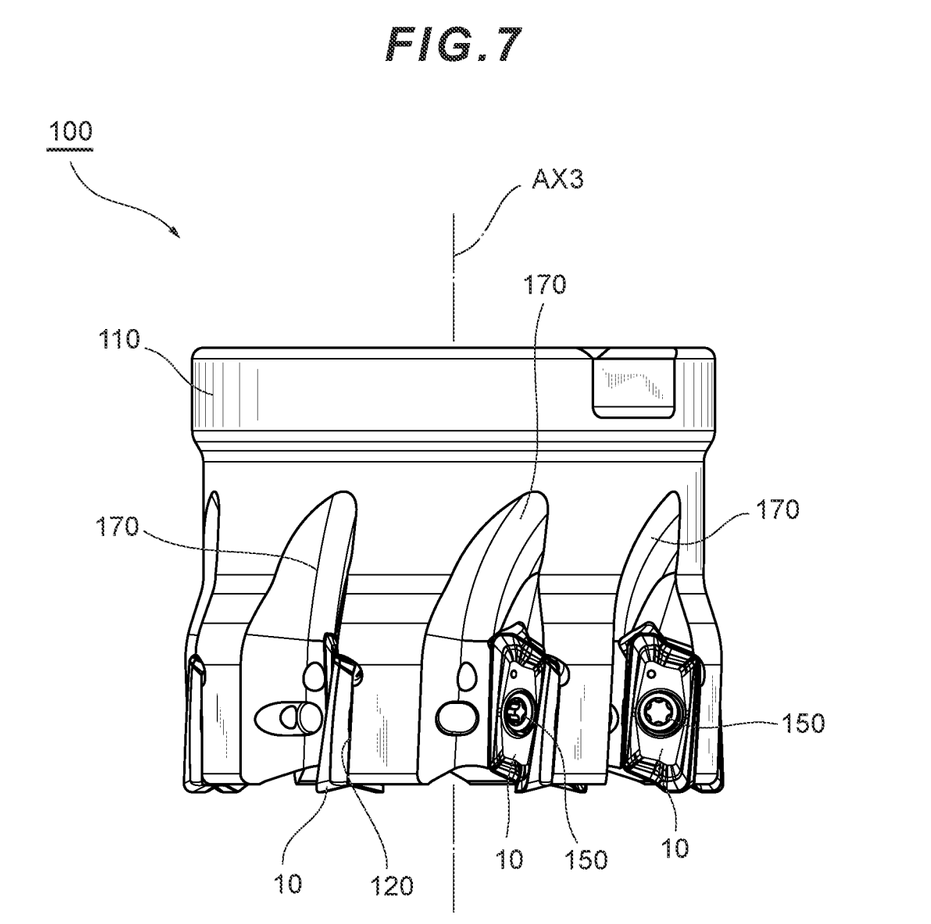
FIG. 7 is a view (side view) of the indexable rotary cutting tool when seen from a direction perpendicular to a rotational axis.
Figure 8:
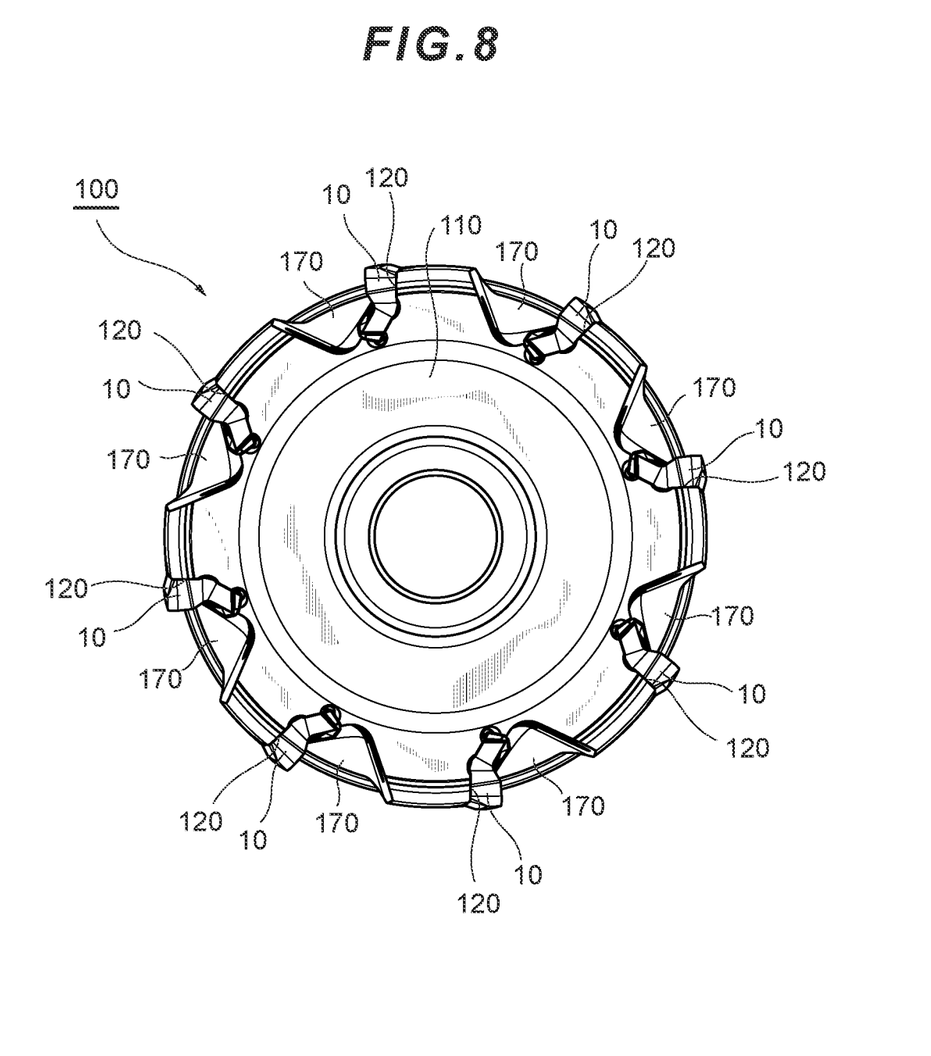
FIG. 8 is a view of the indexable rotary cutting tool when seen from a leading end side along the rotational axis.

In addition, in the cutting insert 10 of this embodiment, on a side view along the first direction D1 (or the third direction D3), as compared with the inclination angle on the one side of the inner edge 23 (in the case of this embodiment, the right-down inclination angle (such an inclination angle of the inner edge or the wiper edge on a side view is referred to as "inclination" in this specification) $\theta_{23L}$ of the left-side inner edge 23L), the inclination angle on the other side (in the case of this embodiment, the right-up inclination $\theta_{23R}$ of the right-side inner edge 23R) is larger and has steeper inclination (see FIG. 4B and the like). Moreover, in the side view along the first direction D1 (or the third direction D3), when a size of the right-up inclination $\theta_{24}$ of the wiper edge 24 is used as a reference of a comparison target, the inclination angle (in the case of this embodiment, the right-down inclination $\theta_{23L}$ of the left-side inner edge 23L) on the one side of the inner edge 23 is smaller than the reference ($\theta_{24}$), and the inclination angle (in the case of this embodiment, the right-up inclination $\theta_{23R}$ of the right-side inner edge 23R) on the other side is larger than the reference ($\theta_{24}$) (see FIG. 4B). Being expressed in a formula, it is as in the following formula (5). The inner edge 23 having the shape as above can realize further improvement of chip discharge control and suppression of chip biting. That is, since the rake surface is further directed to the outer peripheral side by forming the shape of the inner edge 23 as above and by widening the rake surface of the left-side inner edge 23L and by narrowing the rake surface of the right-side inner edge 23R so as to have a structure in which the number of outwardly-directed rake surfaces is relatively increased, chips are directed to the tool outer peripheral side (see FIG. 9), which leads to improvement of the chip discharge control and suppression of the chip biting.

$$\theta_{23L} < \theta_{24} < \theta_{23R} \quad (5)$$

Furthermore, on a top view of the cutting insert 10 of this embodiment seen along the central axis AX1, the following can be considered for the cutting edge angle $\varphi$ indicating inclination of each of the inner edge 23 and the wiper edge 24 with respect to the axis B (or a line in parallel therewith). That is, both the cutting edge angle $\varphi_{23L}$ indicating the inclination of the inner edge on the one side of the recessed part 23c in the inner edge 23 (in the case of this embodiment, the left-side inner edge 23L) and the cutting edge angle $\varphi_{23R}$ indicating the inclination of the inner edge on the other side (in the case of this embodiment, the right-side inner edge 23R) are larger than the inclination angle of the wiper edge 24 (though the reference character ($\varphi_{24}$) is not particularly indicated in FIG. 3, it is obvious from the contents of the cutting edge angle $\varphi_{23L}$ of the left-side inner edge 23L and the cutting edge angle $\varphi_{23R}$ of the right-side inner edge 23R even without the reference characters) (see FIG. 3). Moreover, when the cutting edge angle $\varphi_{23L}$ of the inner edge on the one side of the recessed part 23c in the inner edge 23 (in the case of this embodiment, the left-side inner edge 23L) and the cutting edge angle $\varphi_{23R}$ of the inner edge on the other side (in the case of this embodiment, the right-side inner edge 23R) are compared, the cutting edge angle $\varphi_{23R}$ of the inner edge on the other side (the right-side inner edge 23R) is larger (see FIG. 3). According to the cutting insert 10 including the inner edge 23 having the shape as above, chips discharged from the inner edge 23 are directed to the tool outer peripheral side, whereby further improvement of the chip discharge control and suppression of the chip biting can be promoted (see FIG. 10).

Moreover, in the cutting insert 10 of this embodiment, the cutting edge angle $\varphi_{23L}$ of the inner edge on the one side of the recessed part 23c (in the case of this embodiment, the left-side inner edge 23L) is larger than a half of the cutting edge angle $\varphi_{23R}$ of the inner edge on the other side of the recessed part 23c (in the case of this embodiment, the right-side inner edge 23R) (see FIG. 3). This is expressed by a formula as in the following formula (1). If the cutting edge angle $\varphi_{23L}$ is too small, an amount by which the cutting target (workpiece) can be engraved is reduced during cutting, but by setting the size of the cutting edge angle $\varphi_{23L}$ larger than a predetermined value as above in this embodiment, the engraving amount during the cutting is increased to some extent:

$$\text{Cutting edge angle } \varphi_{23L} > \text{Cutting edge angle } \varphi_{23R}/2 \quad (1)$$

Figure 10:
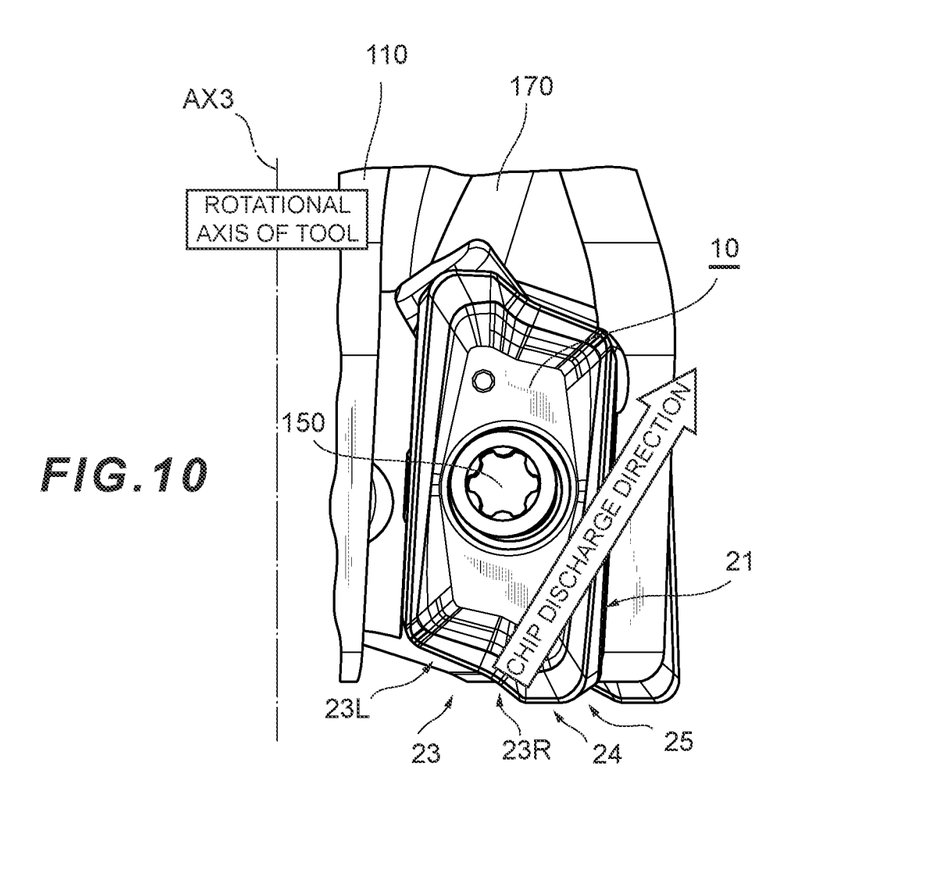
FIG. 10 is a view of the cutting insert mounted on the indexable rotary cutting tool together with the discharge direction of the chips from the cutting insert, when seen from the direction perpendicular to the rotational axis.

Furthermore, in the cutting insert 10 of this embodiment, the cutting edge angle $\varphi_{23R}$ of the inner edge on the other side of the recessed part 23c (in the case of this embodiment, the right-side inner edge 23R) is smaller than the inclination $\theta_{23R}$ indicating the inclination angle of the right-side inner edge 23R in the side view (see FIG. 3 and FIG. 4B). This is expressed in a formula as in the following formula (2). As described above, by having the right-side inner edge 23R with such a shape that the inclination $\theta_{23R}$ is larger than the cutting edge angle $\varphi_{23R}$, chips can be directed easily to the discharge direction as shown in FIG. 10 (see FIG. 10).

$$\text{Cutting edge angle } \varphi_{23R} < \text{Inclination } \theta_{23R} \quad (2)$$

Figure 9:
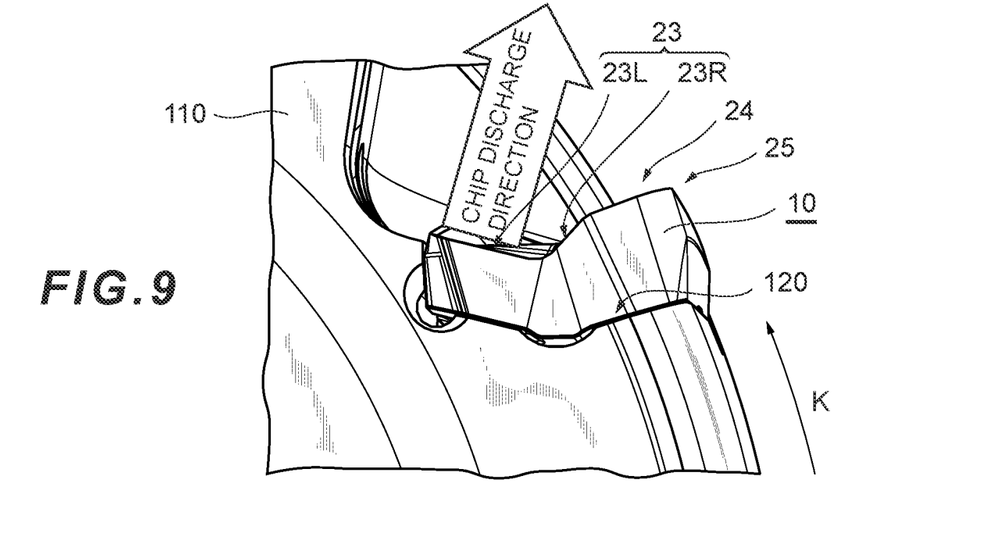
FIG. 9 is a partially enlarged view of FIG. 8 illustrating a discharge direction of chips of a workpiece from the cutting insert during cutting.

Moreover, in the cutting insert 10 of this embodiment, the cutting edge angle $\varphi_{23L}$ of the inner edge on the one side of the recessed part 23c (in the case of this embodiment, the left-side inner edge 23L) is larger than the inclination $\theta_{23L}$ indicating the inclination angle of the left-side inner edge 23L in the side view (see FIG. 3 and FIG. 4B). This is expressed in a formula as in the following formula (3). As described above, by having the left-side inner edge 23L with such a shape that the inclination $\theta_{23L}$ is smaller than the cutting edge angle $\varphi_{23L}$, chips can be directed easily to the discharge direction as shown in FIG. 9 (see FIG. 9).

$$\text{Cutting edge angle } \varphi_{23L} > \text{Inclination } \theta_{23L} \quad (3)$$

Furthermore, in the cutting insert 10 of this embodiment, the length $D_R$ of the inner edge on the other side of the recessed part 23c (in the case of this embodiment, the right-side inner edge 23R) is less than a half of the length $D_L$ of the inner edge on the one side of the recessed part 23c (in the case of this embodiment, the left-side inner edge 23L) in the side view (see FIG. 4B). This is expressed in a formula as in the following formula (4).

$$\text{Length } D_R < \text{Length } D_L/2 \quad (4)$$

Indexable Tool

The indexable rotary cutting tool 100 in which the cutting insert 10 in the embodiment above is removably mounted will be described (see FIG. 6 to FIG. 10 and the like).

The indexable rotary cutting tool 100 of this embodiment includes the tool body 110. The tool body 110 extends in a longitudinal direction, and in the tool body 110, a rotational axis AX3 extending from a leading end side to a rear end side thereof (along the longitudinal direction) is defined (see FIG. 10). Here, the leading end side refers to an end portion side on which the cutting insert 10 is to be mounted in the tool body 110, and the rear end side refers to an end portion side located on a side opposite to that. The indexable rotary cutting tool 100 is constituted rotatably in a rotational direction K side around the rotational axis AX3 (see FIG. 9).

The tool body 110 has a general shape of a substantially cylindrical shape extending along the rotational axis AX3. On the leading end side of the tool body 110, a plurality of the insert mounting seats 120 are formed. In the tool body 110 of this embodiment, eight units of the insert mounting seats 120 are formed (see FIG. 8 and the like), but the number of the insert mounting seats 120 may be smaller than that or may be one. Each of the insert mounting seats 120 is formed so as to be opened to a front of the rotational direction K around the rotational axis AX3 and to be opened to the leading end side and the outer peripheral side (see FIG. 6 and the like). The insert mounting seat 120 includes a bottom wall surface (not shown) which can be brought into contact with each of the two inclined portions 19B of the lower surface 19 in the cutting insert 10 and a side wall surface (not shown) which can be brought into contact with a spot other than the corner peripheral side-surface portion 14 in the first peripheral side-surface portion 11 in the cutting insert 10. Moreover, on the front side in the tool rotational direction K of each of the insert mounting seats 120, a chip pocket 170 to discharge the chips generated by cutting is provided (see FIG. 6, FIG. 7 and the like). To this insert mounting seat 120, a fastening screw 150 is screwed into a screw hole (not shown) through the through hole H so that the cutting insert 10 is removably mounted.

In the indexable rotary cutting tool 100, the cutting insert 10 is disposed on the insert mounting seat 120 so that the major cutting edge 21 substantially extends in the tool longitudinal direction, that is, the direction of the rotational axis AX3. At this time, the minor cutting edge 22 extends in a direction substantially orthogonal to the rotational axis AX3, and the corner cutting edge 25 is located on the tool leading end side and the tool outer peripheral side.

As described above, according to the cutting insert 10 including the recessed part 23c and having the inner edge 23 in which the length of the inner edge on the one side of the recessed part 23c (in the case of this embodiment, the left-side inner edge 23L) is longer than the length of the inner edge on the other side (in the case of this embodiment, the right-side inner edge 23R), chips discharged from the inner edge 23 is directed to the tool outer peripheral side (see FIG. 9), and improvement of the chip discharge control and moreover, suppression of the chip biting can be promoted. Moreover, by having the inner edge 23 with such structure that the lowest point (recessed part 23c) is at the position lower than (the boss surface 17A of) the upper surface 17 in the cutting insert 10, and at least a part of the inner edge on the one side (in the case of this embodiment, the left-side inner edge 23L) is at the position higher than the boss surface 17A, chips discharged from the lowest point portion are brought into contact particularly with the boss surface 17A of the upper surface 17 and as a result, chip separation is improved, whereby further improvement of the chip discharge control and further suppression of the chip biting can be promoted.

Note that the aforementioned embodiment is an example of a preferred embodiment of the present invention but this is not limiting and various modifications can be worked within a range not departing from the gist of the present invention.

For example, in the aforementioned embodiment, the cutting insert 10 in which the one side of the recessed part 23c in the inner edge 23 is the left-side inner edge 23L, and the other side is the right-side inner edge 23R was described (see FIG. 4A and the like), but this is only a typical example. If the indexable rotary cutting tool 100 with the rotational direction K totally opposite is assumed, the structure of the cutting insert 10 is also totally opposite, and the right and left should be vice versa, but it is needless to say that the present invention is applicable even in such a case.

Moreover, in the aforementioned embodiment, as the length $D_L$ of the left-side inner edge 23L and the length $D_R$ of the right-side inner edge 23R, a length in parallel with the intermediate surface M (length along the second direction D2 and/or the fourth direction D4) is indicated, but this is only an example for convenience in order to illustrate comparison between the both lengths to be understood easily, and a length along each of the edges (edge lengths so to speak) of the left-side inner edge 23L and the right-side inner edge 23R, for example, may be the length of each edge.

The present invention is suitably applied to an indexable rotary cutting tool or particularly to a milling tool for square shoulder milling or ramping by an endmill, a so-called indexable tool, and a cutting insert used in these tools.

What is claimed is:

1. A cutting insert comprising:
    an upper surface serving as a first end surface and having a flat part;
    a lower surface serving as a second end surface and being a surface on an opposite side to the upper surface, and having a mounting surface relative to a cutting tool body;
    a screw hole having an axis penetrating from the upper surface to the lower surface;

a peripheral side surface formed so as to connect the upper surface and the lower surface; and a major cutting edge, a wiper edge, and an inner edge formed in an intersecting region between the upper surface and the peripheral side surface, wherein in a side view in which the peripheral side surface on which the inner edge and the wiper edge are formed is seen from a direction perpendicular to the axis, the inner edge includes a recessed part recessed toward the lower surface, a length $D_L$ of the inner edge located on a first side of the recessed part extending away from the wiper edge in the side view is longer than a length $D_R$ of the inner edge on a second side of the recessed part extending toward the wiper edge, a lowest point of the inner edge is located at a position lower than the flat part of the upper surface, and at least a part of the inner edge on the first side of the recessed part is located at a position higher than the flat part of the upper surface, a cutting edge angle $\varphi_{23L}$ of the inner edge on the first side of the recessed part is larger than a half of a cutting edge angle $\varphi_{23R}$ of the inner edge on the second side of the recessed part, and the cutting edge angle $\varphi_{23L}$ of the inner edge on the first side of the recessed part is larger than inclination $\theta_{23L}$ indicating an inclination angle of the inner edge on the first side of the recessed part in the side view.

2. The cutting insert according to claim 1, wherein the cutting edge angle $\varphi_{23R}$ of the inner edge on the second side of the recessed part is smaller than inclination $\theta_{23R}$ indicating an inclination angle of the inner edge on the second side in the side view.

3. The cutting insert according to claim 2, wherein in the side view, the length $D_R$ of the inner edge on the second side of the recessed part is less than a half of the length $D_L$ of the inner edge on the first side of the recessed part.

4. The cutting insert according to claim 3, wherein in the side view, the inclination $\theta_{23R}$ of the inner edge on the second side of the recessed part is larger than the inclination $\theta_{23L}$ of the inner edge on the first side of the recessed part.

5. The cutting insert according to claim 4, wherein in the side view, the inclination $\theta_{23L}$ of the inner edge on the first side of the recessed part is smaller and the inclination $\theta_{23R}$ of the inner edge on the second side of the recessed part is larger than inclination $\theta_{24}$ indicating an inclination angle of the wiper edge.

6. The cutting insert according to claim 1, wherein in a top view seen along the axis, a cutting edge angle indicating inclination of the inner edge on the first side of the recessed part and the cutting edge angle indicating the inclination of the inner edge on the second side of the recessed part are larger than the inclination angle of the wiper edge.

7. An indexable rotary cutting tool, comprising:

a tool body rotated around a rotational axis as a center and having an insert mounting seat to hold a cutting insert; and the cutting insert according to claim 1 to be mounted on the tool body so that the mounting surface is brought into contact with the insert mounting seat.

* * * * *